United States Patent [19]
Miyadera

[11] Patent Number: 5,121,232
[45] Date of Patent: Jun. 9, 1992

[54] DISPLAYING DEVICE HAVING TWO SEPARATE LIGHT RECEIVING PORTIONS FOR RECEIVING THE EXTERNAL LIGHT AND THE LIGHT EMITTED BY A LIGHT SOURCE

[75] Inventor: Shunichi Miyadera, Tokyo, Japan

[73] Assignee: Asahi Kogaku Kogyo Kabushiki Kaisha, Tokyo, Japan

[21] Appl. No.: 598,377

[22] Filed: Oct. 16, 1990

[30] Foreign Application Priority Data

Oct. 18, 1989 [JP] Japan .................. 1-272035
Aug. 28, 1990 [JP] Japan .................. 2-225960

[51] Int. Cl.⁵ ............................ G02F 1/12; F21V 19/02
[52] U.S. Cl. ................................. 359/49; 359/42; 362/367; 362/372
[58] Field of Search ............ 350/345, 334, 331 R; 362/372, 367; 354/219; 359/48, 49, 62, 42

[56] References Cited

U.S. PATENT DOCUMENTS

| | | | |
|---|---|---|---|
| 3,783,765 | 1/1974 | Uno et al. ...................... | 95/42 |
| 3,920,311 | 11/1975 | Tsuda et al. ................... | 350/345 |
| 4,555,170 | 11/1985 | Wakui et al. ................... | 354/470 |
| 4,560,264 | 12/1985 | Kitazawa et al. ............... | 354/219 |

FOREIGN PATENT DOCUMENTS 0014624   1/1987  Japan .................. 350/345
63-296571 12/1988 Japan .

OTHER PUBLICATIONS

IBM, "Backlighting for liquid crystal display", IBM Technical Disclosure Bulletin, vol. 29, No. 11, Apr. 1987, pp. 4838–4839.

*Primary Examiner*—Stanley D. Miller
*Assistant Examiner*—Huy K. Mai
*Attorney, Agent, or Firm*—Sandler, Greenblum & Bernstein

[57] ABSTRACT

A displaying device having a liquid crystal display, a light source, and an illuminating member. The displaying device is provided with at least two light receiving portions for respectively receiving external light and the light emitted by the light source. The illuminating surface of the illuminating member is arranged to face the back surface of the liquid crystal display for illuminating the liquid crystal display from behind. A casing for fixedly accommodating the liquid crystal display, the light source, and the light transmitting member therein is provided. The external light and the light emitted by the light source is selectively or simultaneously received by the illuminating member to illuminate the back surface of the liquid crystal display.

18 Claims, 5 Drawing Sheets

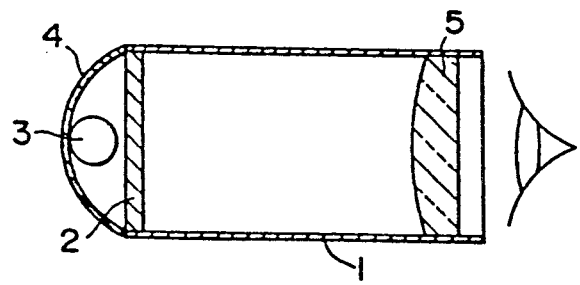
FIG. IA
PRIOR ART
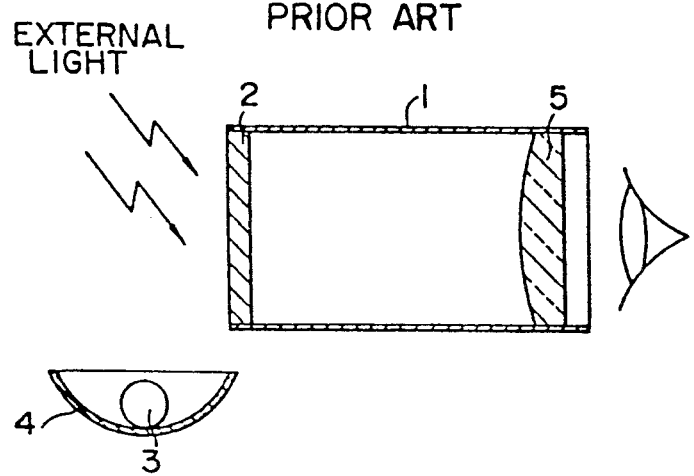
FIG. IB
PRIOR ART
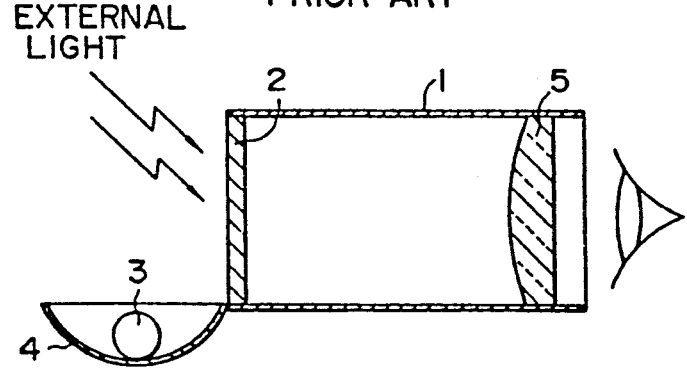
FIG. IC
PRIOR ART

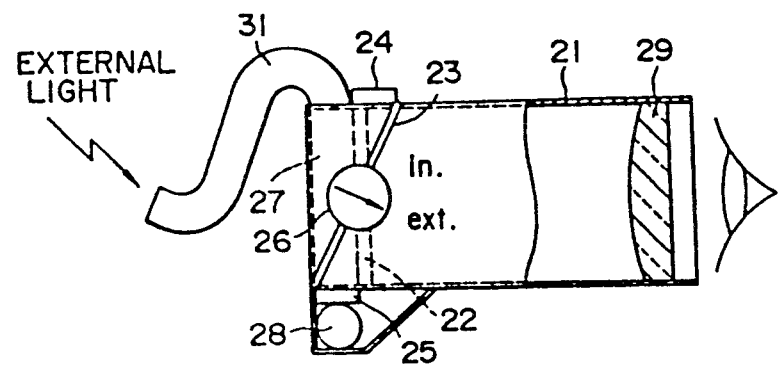
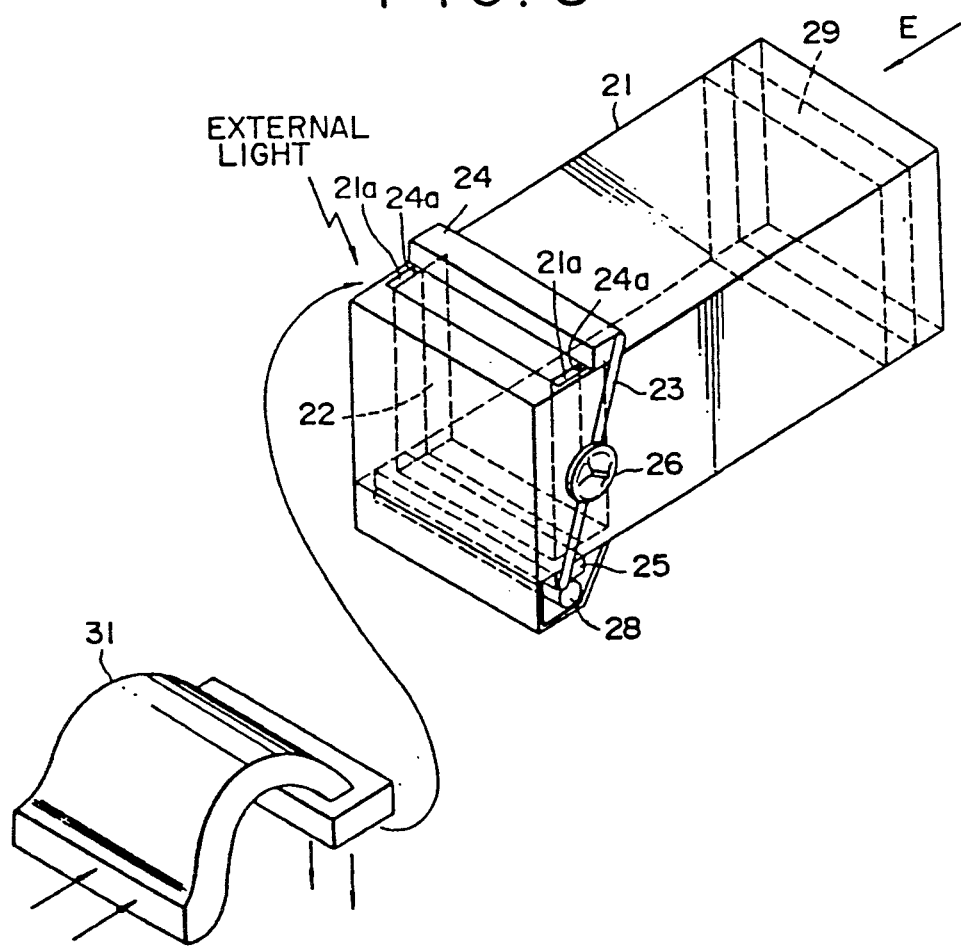

DISPLAYING DEVICE HAVING TWO SEPARATE LIGHT RECEIVING PORTIONS FOR RECEIVING THE EXTERNAL LIGHT AND THE LIGHT EMITTED BY A LIGHT SOURCE

BACKGROUND OF THE INVENTION

This invention relates to a displaying device such as an LCD (Liquid Crystal Display) View Finder applicable to a video camera, an electronic still camera and the like.

FIG. 1A shows a schematic sectional view of a conventional LCD view finder.

On the left hand side of a casing 1, and LCD 2 is arranged. On the opposing right hand side of the casing 1, is provided a lens 5 through which an image displayed on the LCD 2 can be monitored. A light source 3 is disposed behind (left hand side in FIG. 1A) the LCD 2, and a reflection plate 4 is disposed behind the light source 3. The light emitted from the light source 3 is, directly or by way of the reflection plate 4, projected on the back surface of the LCD 2. As constructed above, the image displayed on the LCD 2 becomes relatively easy to see through the lens 5.

When an external light source is used in the conventional type LCD view finder, the inner light sources 3 and the reflection plate 4 are removed from the casing 1, as shown in FIG. 1B, in order to project the light from the external light source onto the back surface of the LCD 2. Alternatively, as shown in FIG. 1C, the reflection plate 4 is made rockable, with respect to the casing 1, together with the inner light sources 3.

FIG. 2 shows another example of prior art relating to LCD view finders. In FIG. 2, the elements corresponding to those in FIG. 1 are provided with the same reference numerals as in FIG. 1. In this device, a light transmitting member 11 is provided behind the LCD 2, and light sources 3 are provided on opposing sides of the peripheral surface of the light transmitting member 11. Thus constructed, the light transmitting member 11 transmits the light emitted from the light sources 3 to project the light onto the back surface of the LCD 2.

When the external light source is employed in this device, the light sources 3 are removed from the casing 1.

As stated above, in the conventional LCD view finders, the inner light source(s) 3 should be made removable or rockable, with respect to the casing 1 in order to employ the external light source. The problem resides in that an operator has to bring the removed light source with him, or prepare a place to position the removed light source while the external light source is used. In a case in which the reflection plate is made rockable, the space required for the rockable reflection plate results in a relatively large device.

SUMMARY OF THE INVENTION

It is therefore an object of the present invention to provide an improved displaying device, such as a view finder, that may be readily used with an external light as well as the light from an inner light source without requiring a wide space.

To achieve the above object, according to the present invention, there is provided a displaying device comprising:
a liquid crystal display;
a light source;
an illuminating member having at least two light receiving portions for respectively receiving external light and the light emitted by the light source, with an illuminating surface of the illuminating member being arranged to face the back surface of the liquid crystal display for illuminating the liquid crystal display from behind; and
a casing for fixedly accommodating the liquid crystal display, the light source, and the light transmitting member therein.

Optionally, the displaying device according to the present invention further comprises select means for the illuminating member to selectively receive either external light or light emitted by the light source.

DESCRIPTION OF THE ACCOMPANYING DRAWINGS

FIGS. 1A through 1C show schematic sectional views of prior arts of a LCD view finder;

FIG. 7 shows a schematic sectional side view of a modified embodiment;

FIG. 8 shows a perspective view of the modified embodiment shown in FIG. 7;

DESCRIPTION OF THE EMBODIMENTS

Figure 2:
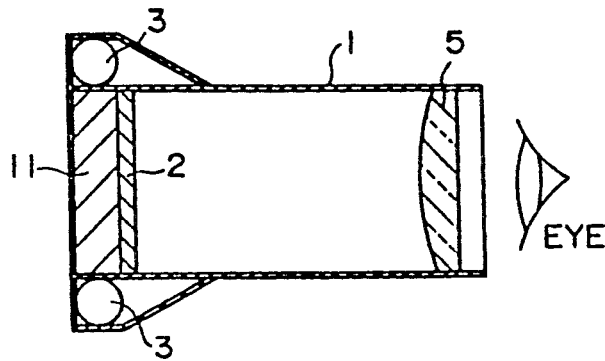
FIG. 2 show a schematic sectional view of another example of prior art of a LCD view finder.

FIGS. 3 through 6 show a LCD view finder embodying the present invention.

An LCD 22 is disposed at the left hand side end of a casing 21. An image displayed on the LCD 22 is monitored from the right hand side of the casing 21 through a lens 29 which is disposed at the right hand side end of the casing 21. A lever 23 is rotatably supported from a center pivot point. Shutters 24, 25 are connected to the ends of the lever 23, respectively. A switching knob 26, provided on the center portion of the lever 23, is operated to switch the shutters 24 and 25. Protrusions 24a, extending toward the casing 21, are provided at either end of the shutter 24. On the upper surface of the casing 21, grooves 21a are formed to be engaged with said protrusions 24a, respectively. Behind the LCD 22 (left hand side of the LCD in FIG. 3), a light transmitting member 27 is provided. An inner light source 28, such as a lamp, fluorescent lamp or the like is arranged below the light transmitting member 27.

Figure 3:
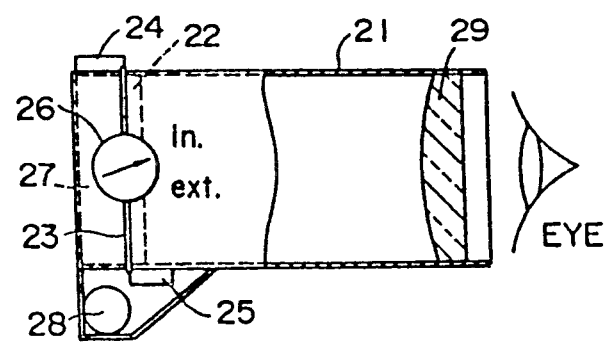
FIG. 3 shows a schematic sectional side view of a LCD view finder using an inner light source, which is an embodiment of the present invention.
Figure 4:
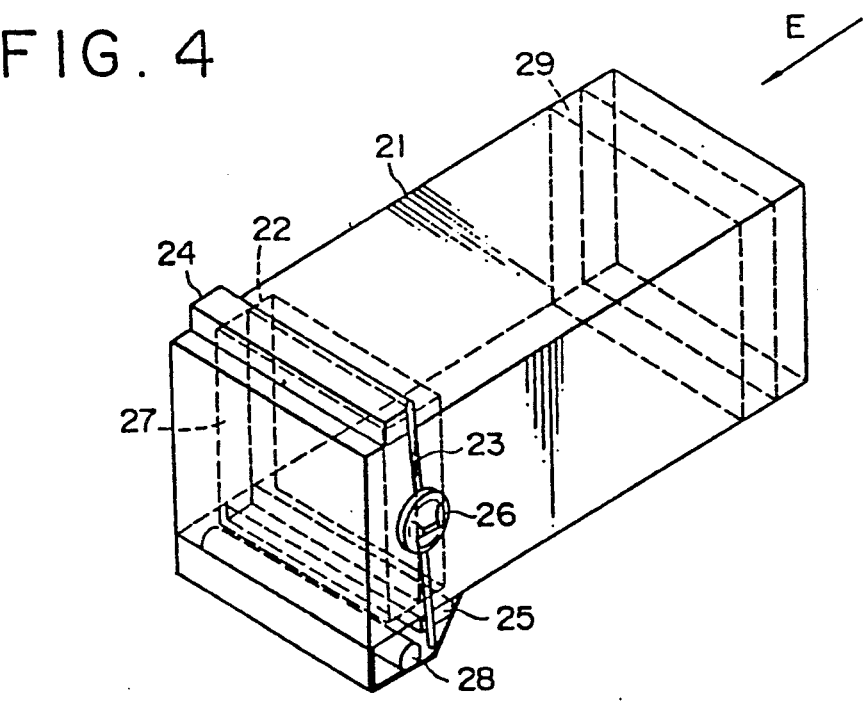
FIG. 4 shows a perspective view of the LCD view finder shown in FIG. 3.

In FIGS. 3 and 4, the switching knob 26 is turned to indicate the inner light source position ("in." position). In this position, the shutter 24 covers the upper peripheral surface of the light transmitting member 27, while the lower peripheral surface of the light transmitting member 27 is exposed to the light from the inner light source 28.

The light emitted from the inner light source is incident to the lower peripheral surface of the light transmitting member 27. The light transmitting member 27 then transmits the light to the back surface of the LCD 22. Since the lower surface of the shutter 24 (the surface of the shutter 24 facing the upper peripheral surface of the light transmitting member 27) is formed to reflect light, the light passed through the light transmitting member 27 is reflected on the lower surface of the shutter 24 and directed towards the back surface of the LCD 22. Thus the back surface of the LCD 22 is illuminated and the image displayed on the LCD 22 can be monitored in the direction E shown in FIG. 4. It should be noted that when the light emitted from the light source 28 is projected onto the back surface of the LCD 22 through the light transmitting member 27, external light directed to the upper peripheral surface of the light transmitting member 27 is shielded by the shutter 24.

Figure 5:
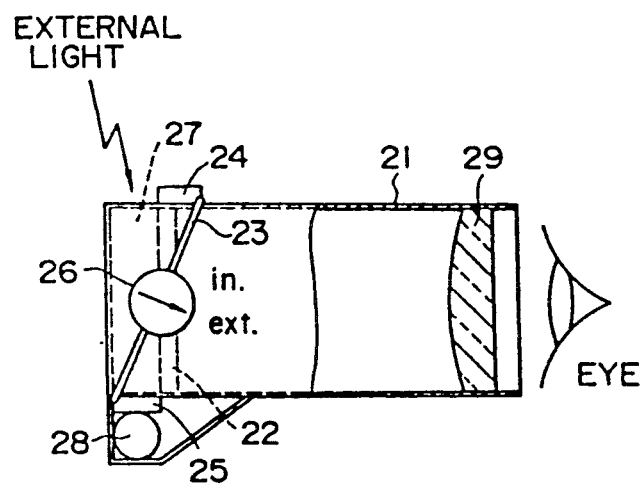
FIG. 5 shows a schematic sectional view of the LCD view finder using external light.
Figure 6:
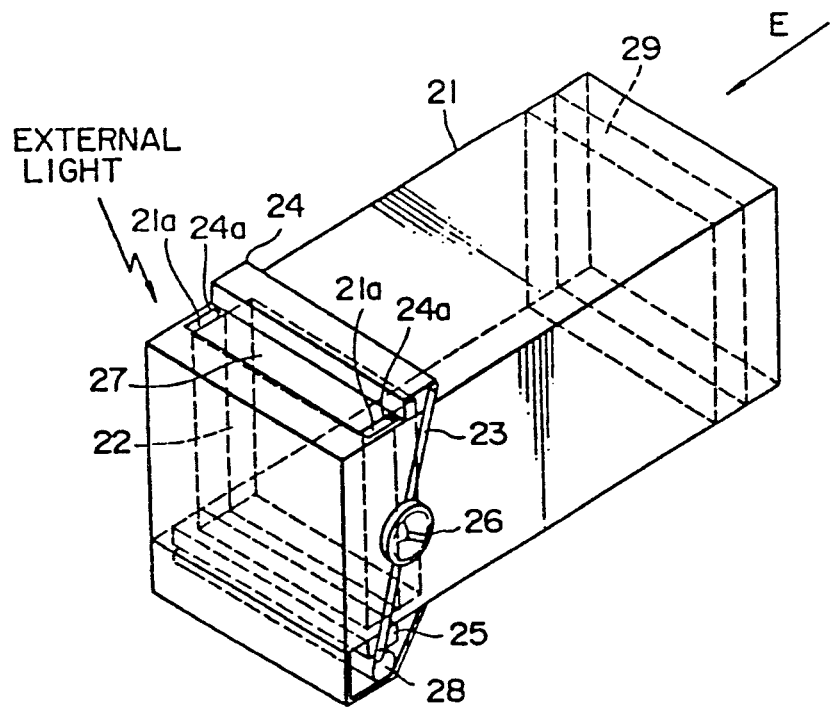
FIG. 6 shows a perspective view of the LCD view finder using the external light.

As shown in FIGS. 5 and 6, when the switching knob 26 is turned clockwise from the position indicating the inner light source 28 to the position indicating the external light ("ext." position), the lever 23 is correspondingly turned clockwise. This causes the shutter 24 to be driven to slide to the right in FIG. 5, while the shutter 25 is driven to slide to the left, whereby the upper peripheral surface of the light transmitting member 27 is exposed to the external light and the lower peripheral surface of the light transmitting member 27 is covered by the shutter 25. In this case, the sliding movement of the shutter 24 is smoothly executed with the protrusions 24a being guided by the grooves 21a. It should be noted that the protrusions are provided only on the shutter 24 in this embodiment, it is possible to provide protrusions on the shutter 25, and grooves to engage with them on the lower surface of the casing 21.

The light emitted by the inner light source 28 does not enter to the light transmitting member 27 as the shutter 25 is located between the inner light source 28 and the lower surface of the light transmitting member 27.

The upper peripheral surface of the light transmitting member 27 is now exposed to the external light. The external light is transmitted by the light transmitting member 27 and projected onto the back surface of the LCD 22. The light passing through the light transmitting member 27 and reaching the lower peripheral surface of the light transmitting member 27 is reflected by the upper surface of the shutter 25 which is formed to reflect light.

As constructed above, either the external light or the light from the inner light source 28 is selectively projected on the back surface of the LCD 22 by the light transmitting member 27, which makes it easy to monitor the image displayed on the LCD 22 from the right hand side of the view finder through the lens 29 in the direction E shown in FIG. 6.

FIGS. 7 and 8 show a modification of the LCD view finder according to the present invention. In FIGS. 7 and 8, the same numerals as in FIGS. 3 through 6 represent the same elements of the device.

In this modification, an optical fiber member 31 is employed with one end thereof being connected to the upper surface of the light transmitting member 27. The external light is introduced to the upper peripheral surface of the light transmitting member 27 by the optical fiber member 31. The other elements of the device are the same as those shown in FIGS. 3 through 6. Also with this modification, the external light can be transmitted through the light transmitting member 27 onto the back surface of the LCD 22 as well as the light emitted from the inner light source 28. Thus the image can be readily monitored in the direction E shown in FIG. 8.

Figure 9:
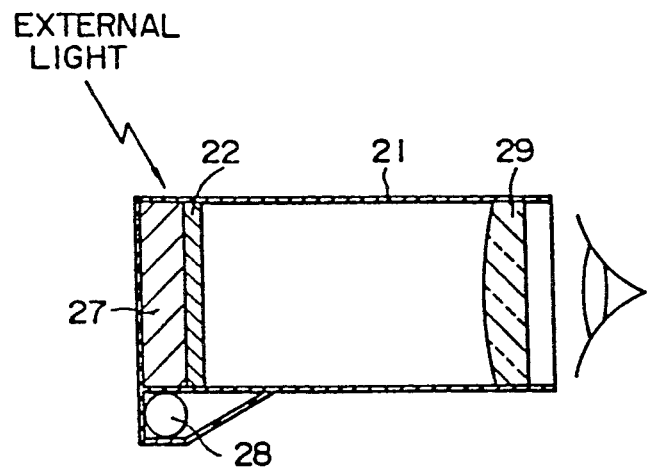
FIG. 9 shows a schematic sectional side view of a third embodiment of the invention.

FIG. 9 shows another modification of the LCD view finder according to the present invention. In this modification, the same numerals as in FIGS. 3 through 8 represent the same elements of the device.

In this modification, the shutters 24, 25, the lever 23, and the switching knob 26 are omitted from the device shown in FIGS. 3 through 6.

In this modification, both the upper and lower peripheral surfaces of the light transmitting member 27 are uncovered, the light, from both the inner light source 28 and the external light, is simultaneously transmitted by the light transmitting member 27 onto the back surface of the LCD 22.

Figure 10:
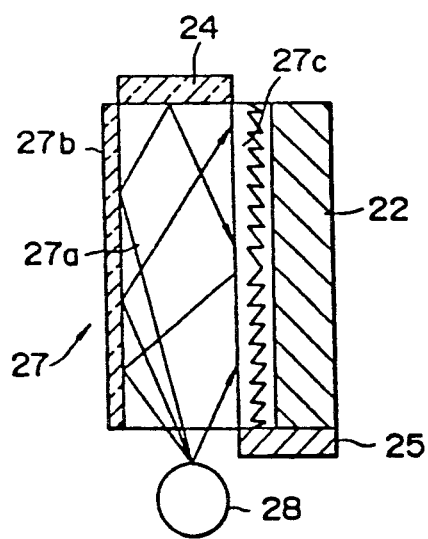
FIG. 10 shows a detailed construction of the light transmitting member.

FIG. 10 shows the detailed construction of the light transmitting member 27. The light transmitting member 27 comprises three layers a light transmitting plate 27a, a reflection plate 27b, and a light diffusion plate 27c; with the reflection plate 27b and the light diffusion plate 27c being positioned on the respective surfaces of the light transmitting plate 27a. The light transmitting plate 27a transmits the light from the inner light source 28 (or the external light) to the light diffusion plate 27c, the reflection plate 27b, or the shutter 24 (or shutter 25). The light reflected by the reflection plate 27b, or the shutter 24 (or the shutter 25) is transmitted by the light transmitting plate 27a again and directed towards the light diffusion plate 27c. The light diffusion plate 27c has a plurality of fine protrusions, each of which has a triangular sectional surface, on the LCD-side surface (the right hand side surface in FIG. 10). The light entering the light diffusion plate 27c is equally diffused and projected to the back surface of the LCD 22.

Stated above, with the LCD view finder according to the present invention, the light from the inner light source and the external light is simultaneously or selectively received by the light transmitting number and transmitted to the back surface of the LCD, thereby the operability becomes improved and the external light can be readily used.

What is claimed:

1. A displaying device comprising:
   a liquid crystal display having a back surface;
   a light source;
   a light transmitting member having at least two separate light receiving portions, said separate light receiving portions comprising a first receiving portion for receiving external light and a second light receiving portion for receiving the light emitted by said light source, an illuminating surface of said light transmitting member being arranged to face the back surface of said liquid crystal display for illuminating said liquid crystal display from behind, said first and second light receiving portions each being substantially perpendicular to said illuminating surface; and
   a casing for accommodating said liquid crystal display, said light source, and said light transmitting member therein.

2. The displaying device according to claim 1, wherein said first and second light receiving portions are located on respective peripheral surfaces of said light transmitting member; and wherein said casing includes openings at the portions corresponding to said respective first and second light receiving portions.

3. The displaying device according to claim 2, wherein the surfaces of said light transmitting member other than said illuminating surface and said light receiving portions are covered with at least an inner surface of said casing, and wherein said surface of said casing which covers said light transmitting member is adapted to reflect light so that the light directed towards any direction is directed towards said illuminating surface.

4. The displaying device according to claim 1, which further comprises select means for causing said light transmitting member to selectively receive one of the external light and the light emitted by said light source.

5. The displaying device according to claim 1, wherein said light receiving portions are located on respective opposite peripheral surfaces of said light transmitting member, and wherein said casing includes two openings corresponding to said respective light receiving portions on the opposite surfaces thereof.

6. The displaying device according to claim 5, wherein the surface of said light transmitting member other than said illuminating surface and said light receiving portions are covered with at least an inner surface of said casing, and wherein the surfaces of said casing which cover said light transmitting member are adapted to reflect light so that the light directed towards any direction, is directed towards said illuminating surface.

7. The displaying device according to claim 6, further comprising select means for causing said light receiving portions to be selectively exposed to one of the external light and the light emitted by said light source.

8. The displaying device according to claim 7, wherein said select means comprises:
   shutter members for respectively covering said openings formed on said casing; and
   switching means for switching the opening on said casing to be covered by a respective one of said shutter members, whereby one of said openings is covered by a respective one of said shutter members while the other one of said openings is uncovered.

9. The displaying device according to claim 8, wherein the surface of each of said shutter members which faces said light receiving portions is adapted to reflect light.

10. The displaying device according to claim 8, wherein said switching means comprises an operating member for operating said shutter members to selectively close one of said openings.

11. The displaying device according to claim 10, further comprising a light introducing member for introducing external light to one of said light receiving portions, one end of said light introducing member being adapted to be exposed to external light, the other end of said light introducing member including means to connect to the opening corresponding to the other one of said light receiving portions.

12. The displaying device according to claim 1, wherein said illuminating surface of said light transmitting member is adapted to diffuse light.

13. The displaying device according to claim 1, further comprising a view finder.

14. A displaying devcice comprising:
   a liquid crystal display having a back surface;
   a light source;
   a light transmitting member having at least two separate light receiving portions, said separate light receiving portions comprising a first light receiving portion for receiving external light and a second light receiving portion for receiving light emitted by said light source, an illuminating surface of said light transmitting member being arranged to face the back surface of said liquid crystal display for illuminating said liquid crystal display from behind, said first and second light receiving portions each being substantially perpendicular to said illuminating surface;
   select means for selectively causing only one of said first and second light receiving portions to be exposed to one of the external light and the light emitted by said light source; and
   a casing for accommodating said liquid crystal display, said light source, and said light transmitting member therein.

15. The displaying device according to claim 14, wherein said first and second light receiving portions are located on separate peripheral surfaces of said light transmitting member.

16. The displaying device according to claim 14, wherein said casing includes openings corresponding to respective said first and second light receiving portions.

17. The displaying device according to claim 16, wherein said select means comprises shutter members for covering respective said openings.

18. The displaying device according to claim 17, comprising switching means to move said shutter means, whereby one of said openings is covered by a shutter member while another opening is uncovered.

* * * * *

UNITED STATES PATENT AND TRADEMARK OFFICE
CERTIFICATE OF CORRECTION

PATENT NO. : 5,121,232
DATED : June 9, 1992
INVENTOR(S) : S. MIYADERA

It is certified that error appears in the above-indentified patent and that said Letters Patent is hereby corrected as shown below:

At column 4, line 50 (claim 1, line 6) insert
--light--- after 'first".

Signed and Sealed this

Twenty-ninth Day of March, 1994

*Attest:*

BRUCE LEHMAN

*Attesting Officer*     *Commissioner of Patents and Trademarks*